(No Model.) 3 Sheets—Sheet 2.
T. A. KILLMAN & H. A. BRATTEN.
WEIGHING AND COMPUTING SCALE.
No. 565,756. Patented Aug. 11, 1896.
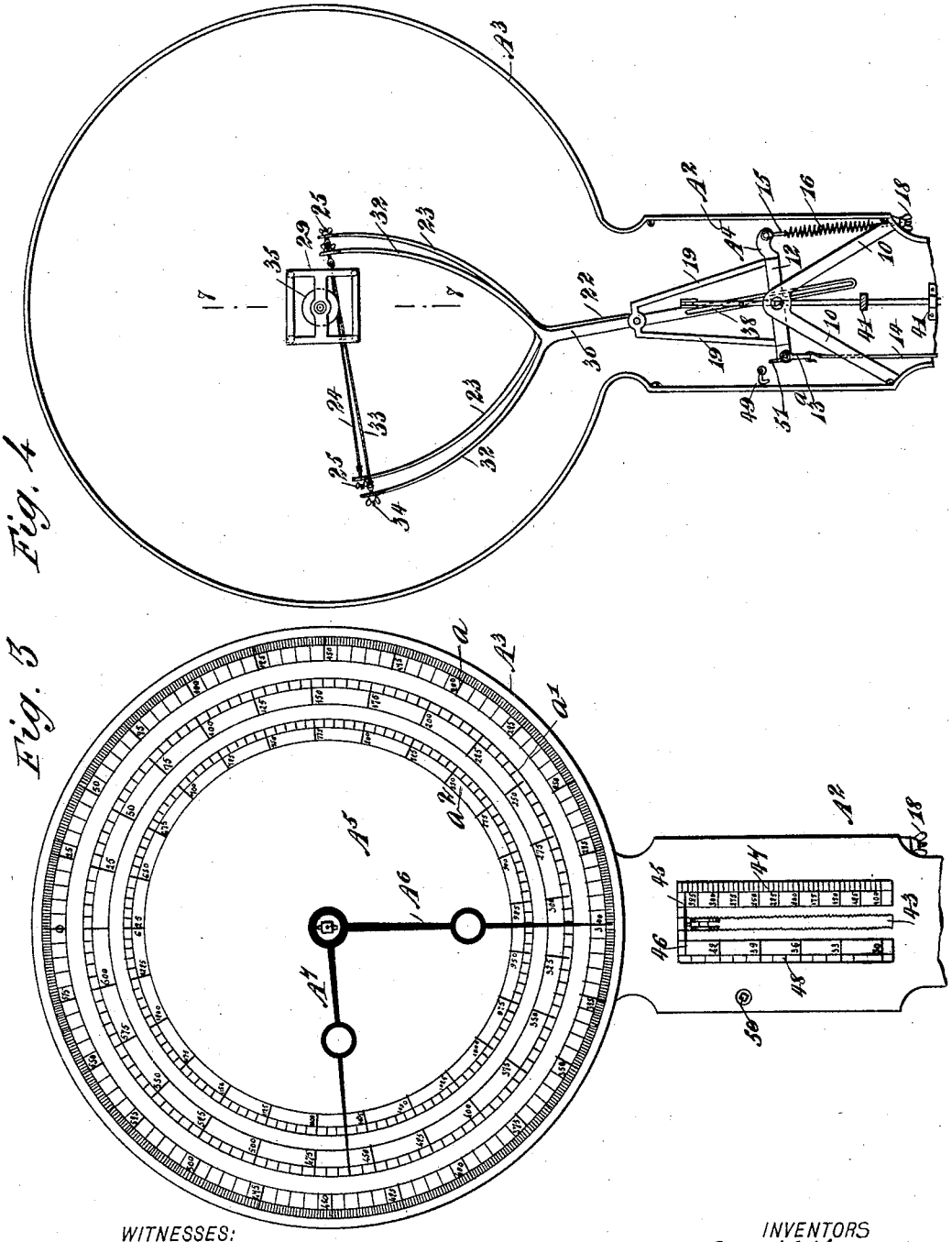

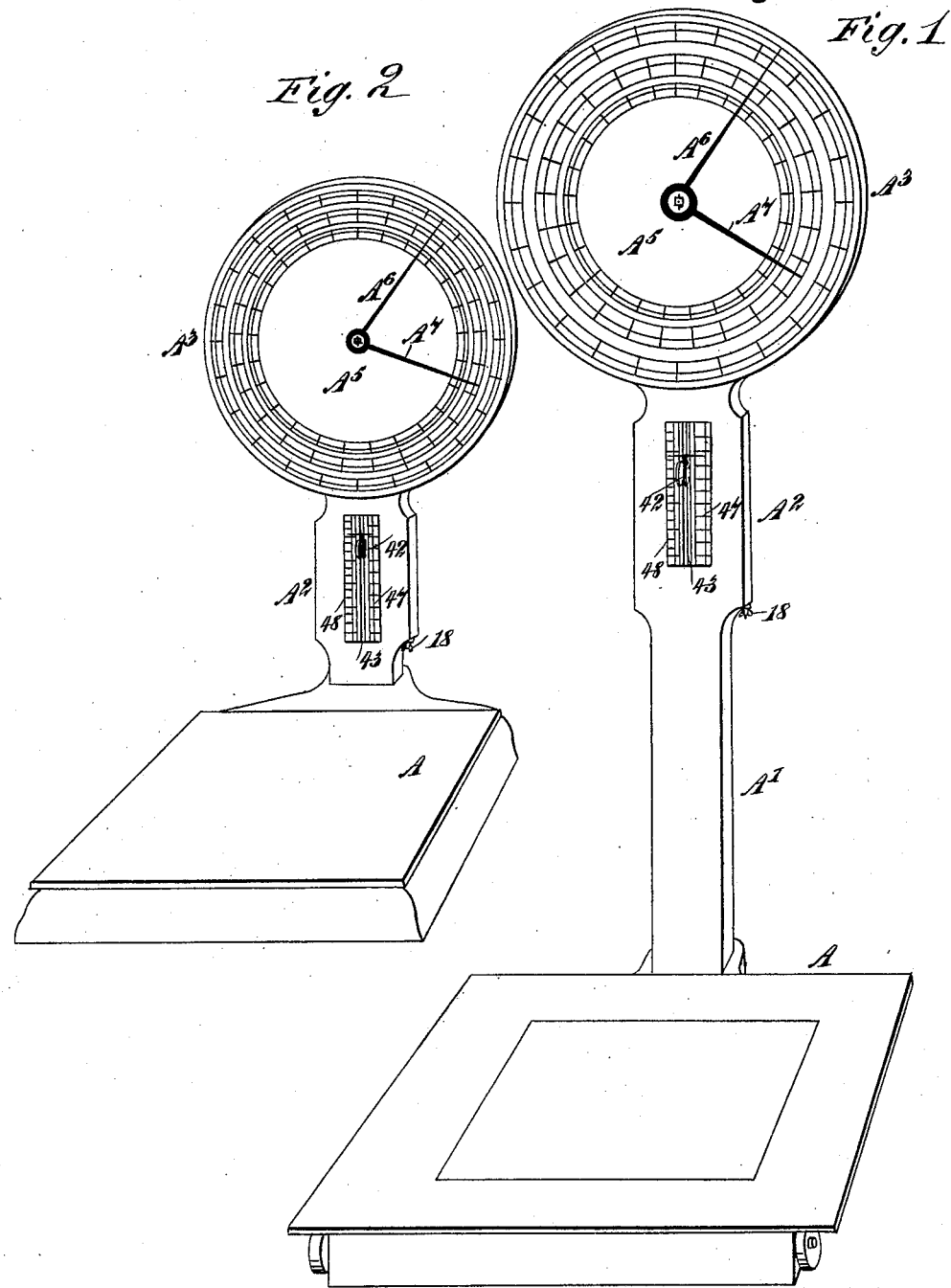

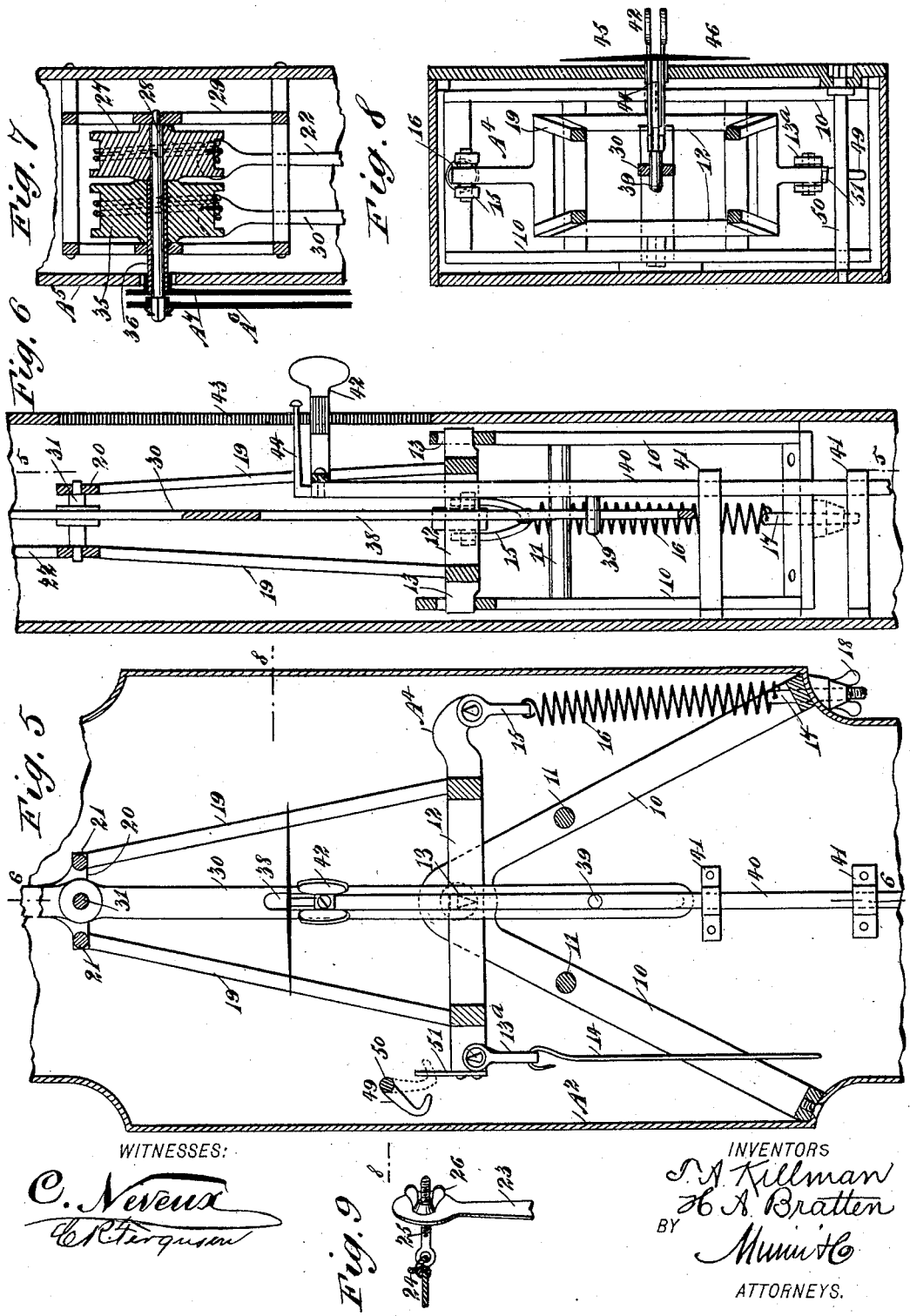
(No Model.) 3 Sheets—Sheet 3.
T. A. KILLMAN & H. A. BRATTEN.
WEIGHING AND COMPUTING SCALE.
No. 565,756. Patented Aug. 11, 1896.

UNITED STATES PATENT OFFICE.

THOMAS A. KILLMAN AND HERSCHEL A. BRATTEN, OF LIBERTY, TENNESSEE.

WEIGHING AND COMPUTING SCALES.

SPECIFICATION forming part of Letters Patent No. 565,756, dated August 11, 1896.

Application filed November 26, 1895. Serial No. 570,211. (No model.)

*To all whom it may concern:*

Be it known that we, THOMAS A. KILLMAN and HERSCHEL A. BRATTEN, of Liberty, in the county of Dekalb and State of Tennessee, have invented a new and Improved Weighing and Computing Scale, of which the following is a full, clear, and exact description.

This invention relates to weighing and computing or price scales, and the object is to provide a simple and accurate means whereby the price of an article being weighed may be readily ascertained, thereby making the device particularly useful for millers or dealers in grain or a like article.

We will describe a weighing and computing scale embodying our invention, and then point out the novel features in the appended claims.

Reference is to be had to the accompanying drawings, forming a part of this specification, in which similar characters of reference indicate corresponding parts in all the views.

Figure 1 is a front elevation in perspective of a weighing and computing scale embodying our invention. Fig. 2 is a similar view to Fig. 1, but showing the device applied to counter-scales. Fig. 3 is an enlarged front view showing the weighing and computing dial and the units price-scale. Fig. 4 is a front elevation with the front of the casing removed to show certain working parts. Fig. 5 is a section on the line 5 5 of Fig. 6. Fig. 6 is a section on the line 6 6 of Fig. 5. Fig. 7 is an enlarged view in section on the line 7 7 of Fig. 4. Fig. 8 is a section on the line 8 8 of Fig. 5, and Fig. 9 is a perspective view of a tension device employed.

Referring to the drawings, A designates the platform of the scale, and A' is an upwardly-extending hollow post having an enlarged chamber portion $A^2$ at its upper end and communicating with a cylindrical casing $A^3$. Within the chamber $A^2$ is affixed a fulcrum-frame comprising inverted V-shaped side members 10, secured by screws or otherwise at their lower ends to the sides of the chamber-casing, and attached one to the other by means of transverse bars 11.

$A^4$ is the scale-beam, having a central substantially rectangular frame portion 12, which has fulcrum-bearings 13 on the frame, consisting of the members 10. The scale-beam at its rear end is provided with a link $13^a$, from which a rod 14 extends to a connection with a platform of the scale or to the mechanism operated thereby in the usual way. The opposite end of the scale-beam is provided with a link 15, from which a spring 16 extends to an engagement with a rod 17, extended through an opening in the wall of the post A', and having its outer threaded end engaged by a thumb-nut 18, by means of which the tension of the spring 16 may be regulated to balance the scale.

Extended upward from the rectangular frame portion 12 of the scale-beam are bars 19, the upper ends of the bars on the respective sides of the frame 12 being connected by a transverse bar 20, and the bars 19 of the opposite side are connected together by cross-rods 21.

It will be seen that the parts 19, 20, and 21 form a rigid frame carried by the scale-beam. From the rear transverse bar 20 an arm 22 extends upward and terminates in diverging arms 23. A flexible connection, such, for instance, as a cord or chain 24, extends from one to the other of the arms 23. The ends of this connection 24 may be attached to screw-rods 25, which extend through perforations in the upper ends of the arms 23, and are provided with thumb-nuts 26, by means of which the tension of the connection 24 may be regulated. The flexible connection 24 extends over a roller 27, rigidly mounted on a shaft 28, having bearings in a frame 29, mounted in the casing $A^3$. The shaft 28 extends outward through the front or dial $A^5$ of the casing and has attached to it a pointer $A^6$.

A computer-bar 30 is rigidly mounted on a shaft 31, having bearings in the bars 20, supported by the arms 19. This computer-bar 30 at its upper end terminates in diverging arms 32, which carry a flexible connection 33 and tension-regulating mechanism 34, similar to that above described for the connection 24, and this flexible connection 33 extends around a roller 35, mounted on a sleeve 36, surrounding the shaft 28 and extended through the dial $A^5$, where it is provided with a computer-pointer $A^7$. A portion of the computer-bar 30 below its pivotal point extends a distance below the pivotal point of the scale-beam and is provided with a longitudinal slot 38, the said slot also extending above and below the pivotal point of the scale-beam.

The computer-bar 30 is provided with an adjustable fulcrum, whereby its movement may be accurately adjusted to cause the movement of the computer-pointer relatively to the weight-indicating pointer to readily ascertain the price of an article according to its weight. This adjustable fulcrum consists of a pin 39, extended into the slot 38 from an adjusting-bar 40, which has a vertical sliding movement in guides 41, extended from the wall of the post $A'$. Spring-yielding fingers 42 extend outward from the upper portion of the bar 40 through a slot-opening 43 in the front wall of the chamber $A^2$. These fingers 42 are provided with finger-plates at their outer ends, and the sides of the fingers 42 are serrated to engage with the serrated walls of the slot 43, so as to hold the parts as adjusted. Above the fingers 42 is an arm 44, extended from the bar 40 outward through the slot 43 and provided at its outer end with pointers 45 46, extended laterally and adapted to operate, respectively, with an exchange-scale 47, marked on the casing at one side of the slot 43, and with a units price-scale 48, marked on the opposite side of said slot 43.

The dial $A^5$ has two or more annular rows of indices. As here shown it has an outer row $a$ for indicating the weight, an intermediate row $a'$, and an inner annular row of indices $a^2$. These two inner rows $a'$ $a^2$ have their divisions marked consecutively—that is, the row $a'$ begins with zero ("0") and ends with "600," and the inner row $a^2$ begins with "625" and ends with "1225," so that in fact the inner row is a continuation of the row $a'$. These two rows may be used for indicating either the cost of an article on the scale or the weight of a commodity to be given in exchange for the commodity on the scale. The pointer $A^6$ coacts with the outer row of indices $a$ and the pointer $A^7$ with the other two annular rows of indices.

We provide means for locking the scale-beam and the parts connected therewith in a rigid position when it is desired to do so for the purpose of preventing their movement and possible derangement when the scale is transported from place to place. As here shown this means consists of a hook 49, extended downward and inward from a shaft 50, having bearings in the opposite walls of the casing $A^2$, and projected through the front wall, where it is provided with an angular portion adapted to be engaged by a key by means of which the shaft may be rotated or rocked to engage the hook 49 with a staple 51 on the rear end of the scale-beam.

The operation of the device may be stated as follows: We will assume that the value of a commodity is forty-five cents for one hundredweight. The commodity will be placed upon the scale-platform and its weight ascertained by the pointer $A^6$, indicating on the scale or row of indices $a$, for instance, three hundred pounds. The pointer 46 having been previously moved to the point "45" on the scale 48, the fulcrum-pin 39 will be so adjusted in the slot 38 of the computer-bar 30 as to allow the movement of the upper end of said computer-bar to rotate its wheel 35 and consequently move the pointer $A^7$ a greater distance over the dial than the movement of the pointer $A^6$, and this pointer $A^7$ will move to the point on the intermediate row of indices $a'$ to indicate "135," or "$1.35" and this same manipulation or result would be obtained should it be desired to exchange a commodity worth a certain amount per hundredweight for another commodity worth a different amount per hundredweight.

It is obvious that our invention may be applied to an old pair of scales by simply removing the old post and substituting the one embodying our invention, thereby saving the expense of the platform portion at least of the scales to the purchaser.

Having thus described our invention, we claim as new and desire to secure by Letters Patent—

1. A weighing and computing scale, comprising a scale-beam, a frame rigid therewith, an upwardly-projecting arm rigid with the frame and operating a pointer, a second arm pivoted between its ends in the said frame and operating a pointer, and an adjustable fulcrum for the said second arm, substantially as described.

2. A weighing and computing scale, comprising a scale-beam, an upwardly-projecting frame secured to the scale-beam and provided with an upwardly-extending arm, means for operating a pointer from said arm, an arm pivoted between its ends in the said frame, means for operating a pointer from the said pivoted arm, and an adjustable fulcrum for said arm, substantially as described.

3. A weighing and computing scale, comprising a scale-beam, a frame mounted thereon, a bar extended rigidly from said frame and having divergent arms, a flexible connection between said arms, a pointer rotated by said flexible connection, a computer-bar having pivotal connection with the frame carried by the scale-beam and adapted to operate a pointer, and an adjustable fulcrum for said computer-bar, substantially as specified.

4. A weighing and computing scale, comprising a scale-beam, a frame mounted thereon, divergent arms supported rigidly by said frame, a flexible connection extended between the upper ends of said arms, a roller around which said flexible connection extends, a shaft on which the roller is mounted, a pointer carried by said shaft, a computer-bar having pivotal connection with a frame on the scale-beam and adapted to operate a pointer, an adjustable fulcrum for said bar comprising a pin extended through a slot located in said bar below its pivotal point, a pointer carried by said bar, a scale over which said pointer is movable, and means for securing the bar as adjusted, substantially as specified.

5. A weighing and computing scale, comprising a scale-beam, having connection at one end with the platform mechanism of the scale, and having an adjustable spring connection at its other end, an upwardly-extending frame carried by said scale-beam, a bar extended rigidly upward from said frame and having divergent arms, an adjustable flexible connection between the upper ends of said arms, a pointer operated over a dial by said flexible connection, a computer-bar having pivotal connection with a frame carried by the scale-beam and having divergent arms at its upper end, a flexible connection extended between said arms, a pointer operated by said flexible connection, and a vertically-adjustable fulcrum for said computer-bar, substantially as specified.

6. The combination with a scale-beam, of a pointer-operating arm or arms rigidly mounted thereon, a pivoted computer-bar having a slotted lower end, a pointer operated by said computer-bar, an adjustable fulcrum for said computer-bar, comprising a pin extended through the slot in the bar, a vertically-adjustable rod to which said pin is attached, spring-yielding fingers extended outward from said vertically-moving bar through a slot in the front of the casing, and adapted to lock the bar as adjusted, and a pointer carried by said bar and movable over a scale on the outside of the casing, substantially as specified.

THOMAS A. KILLMAN.
HERSCHEL A. BRATTEN.

Witnesses:
WILL A. VICK,
G. W. BRADLEY.